United States Patent [19]
Crelier

[11] Patent Number: 5,978,585
[45] Date of Patent: Nov. 2, 1999

[54] DEVELOPMENT SYSTEM WITH IMPROVED METHODS FOR RECOMPILING DEPENDENT CODE MODULES

[75] Inventor: Regis Crelier, Santa Cruz, Calif.

[73] Assignee: Inprise Corporation, Scotts Valley, Calif.

[21] Appl. No.: 08/826,453

[22] Filed: Mar. 27, 1997

[51] Int. Cl.$^6$ .................................................. G06F 9/445
[52] U.S. Cl. ............................................................ 395/705
[58] Field of Search .................................. 395/705, 700, 395/183.16

[56] References Cited

U.S. PATENT DOCUMENTS

| | | | |
|---|---|---|---|
| 5,204,960 | 4/1993 | Smith et al. | 395/700 |
| 5,367,683 | 11/1994 | Brett | 395/700 |
| 5,586,328 | 12/1996 | Caron et al. | 395/705 |

OTHER PUBLICATIONS

Interprocedural Optimization: Eliminating Unnecessary Recompilation by Burke et al published in ACM, 1994.
Separate Compilation for Standard ML by Appel et al published in ACM, 1994.
Smart Recompilation and the GNAT Compiler by Gasperoni et al published ACM, 1994.
Crelier, Regis, *Separate Compilation and Module Extension*, Dissertation submitted to the Swiss Federal Institute of Technology Zurich, 1994. (Complete bound copy submitted).

*Primary Examiner*—Robert W. Downs
*Assistant Examiner*—Chameli C. Das
*Attorney, Agent, or Firm*—John A. Smart

[57] ABSTRACT

A development system providing methodology for improving system performance by decreasing recompilation of dependent source modules is described. During operation, the system keeps track of several pieces of information. From the outset, the system has kept track of the timestamps of sources (e.g., A.java file in a Java system) and compiled files thereof (e.g., A.class class file in a Java system). Examination of the timestamps leads to detection of those files which have been modified. The system will recompile A.java in the following circumstances: (1) A.class is not found, (2) A.java has a different timestamp, or (3) A.class has a different timestamp. Otherwise, the system does not invoke a recompile. If a recompilation in not required, the system then looks to the imports for determining whether the imports are consistent. Here, the system checks the timestamps of imports, possibly recompiling one or more of the modules providing the imports. If the imports have been recompiled, then the system must check the root module for determining whether it remains consistent with the imports—that is, whether A is still consistent with its imports. If not, the system recompiles the source file (e.g., A.java).

18 Claims, 7 Drawing Sheets

DEVELOPMENT SYSTEM WITH IMPROVED METHODS FOR RECOMPILING DEPENDENT CODE MODULES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a system providing methods for facilitating development of software programs, with particular emphasis on decreasing the time such a system spends on recompiling source modules during program development.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," that is, the low-level, minute instructions for performing specific tasks—the sequence of ones and zeros that are interpreted as specific instructions by the computer's microprocessor. Since machine language or machine code is the only language computers actually understand, all other programming languages represent ways of structuring "human" language so that humans can get computers to perform specific tasks.

While it is possible for humans to compose meaningful programs in machine code, practically all software development today employs one or more of the available programming languages. The most widely-used programming languages are the "high-level" languages, such as C or Pascal, or more recently Java. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module," which includes instructions for execution ultimately by a target processor, or a compiled Java class, which includes opcode instructions for execution ultimately by a Java virtual machine. Although a compiled module includes code for instructing the operation of a computer, such a module itself is typically not in a form which may be directly executed by a computer. In other words, it does not form the final program which is executable on a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (such as an .exe file) which, after testing and quality assurance, is passed to the user with appropriate installation and usage instructions.

Conventionally, creation of a software program includes creation of individual source code modules. This approach allows the developer to simplify program development by dividing functionality available in the program into separate source modules. When multiple source modules are employed for creating a program, interdependencies between the individual modules often exist. Program logic in one module can, for instance, reference variables (i.e., symbols) imported from another module. By the very same token, that module can also export its own symbols, making them available for use by other modules.

Because of potential interdependencies between modules, an issue arises when a particular source module is modified (e.g., edited by a user). In particular, regardless of which language or development tool is employed, a problem exists as to how one recompiles source modules which might have changed (e.g., as a result of a programmer editing a particular source module). When building C/C++ applications, for instance, the current technique is to employ a "make" tool for instructing the compiler to recompile every source that depends on a modified and recompiled source, regardless of the type of dependency between both sources. This is a suboptimal approach, however. Consider, for instance, the act of modifying a comment in source code—that is, a modification which does not impact the final compiled program. Using existing approaches, the act of modifying a comment in a source results in a recompilation of any dependent source modules (i.e., the clients of the source). In turn, the clients of the latter source will also be recompiled. Specifically, the system must ensure that such a change is compatible with the other modules of the program. A particular concern is, therefore, that a given change might "break" the program, because the change is incompatible with other, dependent modules.

The present day approach to the problem is unsophisticated. When faced with a modification to a given source module, development systems today simply recompile all dependent modules, for ensuring that the dependent modules remain compatible with the new modification. Such an approach is suboptimal, however. Consider, for instance, a simple modification to a source module, such as the above-mentioned editing a single source code comment. Since source code comments do not lead to the generation of program code or provide any symbol information, such a change will have no impact on modules which are otherwise dependent on the just-changed module. Nonetheless, the current approach is to still simply recompile all dependent modules. Such an approach is clearly suboptimal as none of the dependent modules in the example actually require compilation.

The problem is more general in nature, however. For a given change to a source module, the need to actually recompile dependent modules may include none, some, or all of the dependent modules. Stated generally, therefore, the system needs to discern at some level the nature of the modification to the given source module so that it can proceed to only recompile those modules (if any) affected by the change. By reducing the number of recompiles, the system can speed up the edit/compile cycle which serves as the cornerstone of modern day software development.

What is needed is a system with methods for recompiling only those source modules which really need to be recompiled after a modification. Minimizing the number of recompilations can greatly speed up the process of software development. The present invention fulfills this and other needs.

SUMMARY OF THE INVENTION

A development system of the present invention includes a client which employs a virtual machine for executing programs written in the Java programming language. The client executes a "compiled" (i.e., bytecode or pseudo-compiled) Java program, which has been created by compiling a Java source code program or script with a Java compiler. Here, the Java source code program is an application program written in the Java programming language. The program comprises objects created from Java classes; each class defines data and methods for the class. The pseudo-compiled program comprises the bytecode emitted by the compiler. The virtual machine includes a runtime interpreter for interpreting the Java bytecode program. During operation, the client simply requests the virtual machine to execute a particular Java compiled program.

The development system of the present invention includes methodology for improving system performance by decreasing recompilation of dependent source modules. During operation, the system keeps track of several pieces of information. From the outset, the system has kept track of the timestamps of sources (e.g., A.java file in a Java system) and compiled files thereof (e.g., A.class class file in a Java system). Examination of the timestamps leads to detection of those files which have been modified. The system will recompile A.java in the following circumstances: (1) A.class is not found, (2) A.java has a different timestamp, or (3) A.class has a different timestamp. Otherwise, the system does not invoke a recompile. If a recompilation in not required, the system then looks to the imports for determining whether the imports are consistent. Here, the system checks the timestamps of imports, possibly recompiling one or more of the modules providing the imports. If the imports have been recompiled, then the system must check the root module for determining whether it remains consistent with the imports—that is, whether A is still consistent with its imports. If not, the system recompiles the source file (e.g., A.java).

DETAILED DESCRIPTION OF A PREFERRED EMBODIMENT

The following description will focus on a preferred embodiment of the present invention (and certain alternatives) embodied in a visual development environment running on an Intel 80x86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
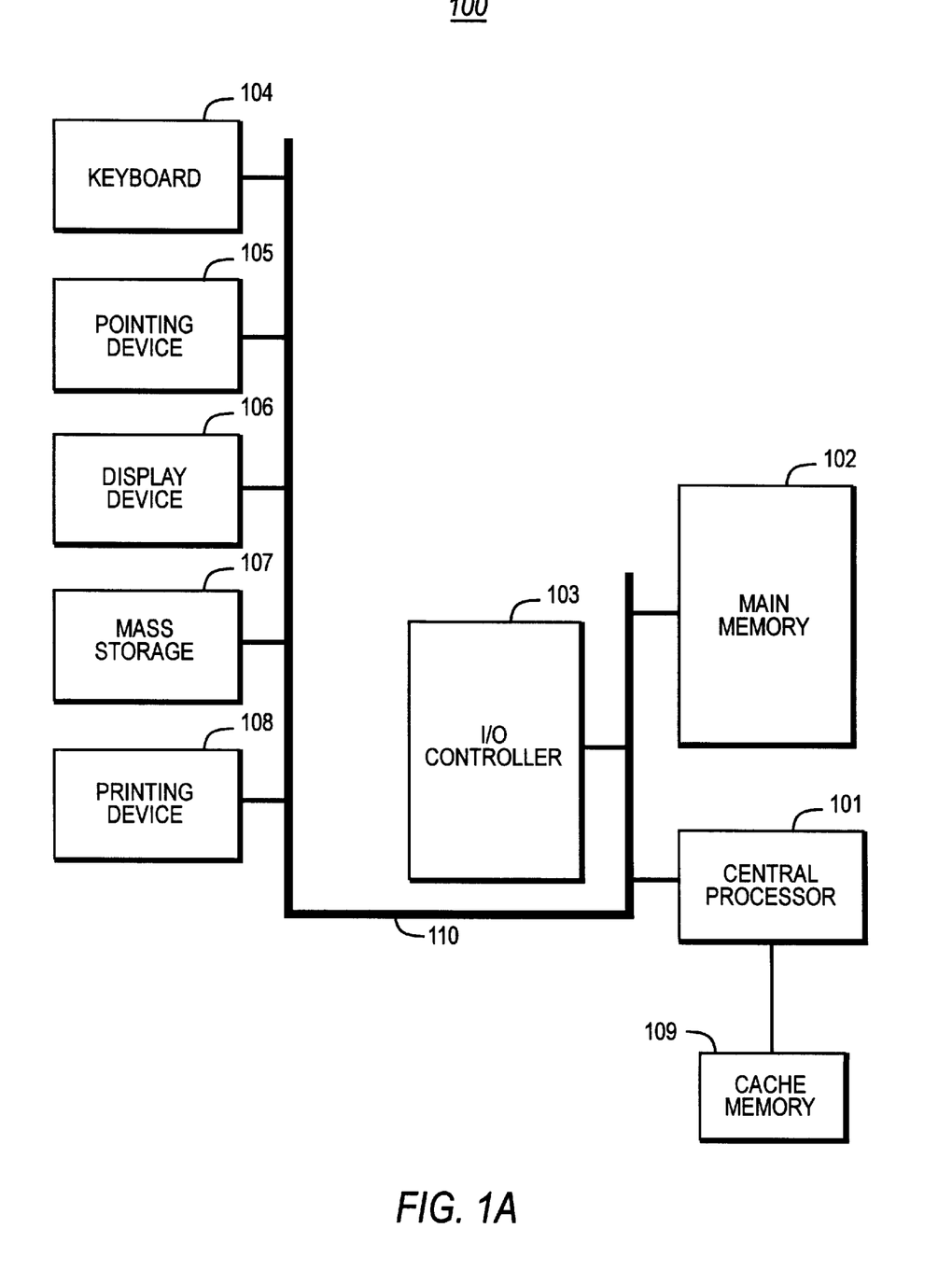
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
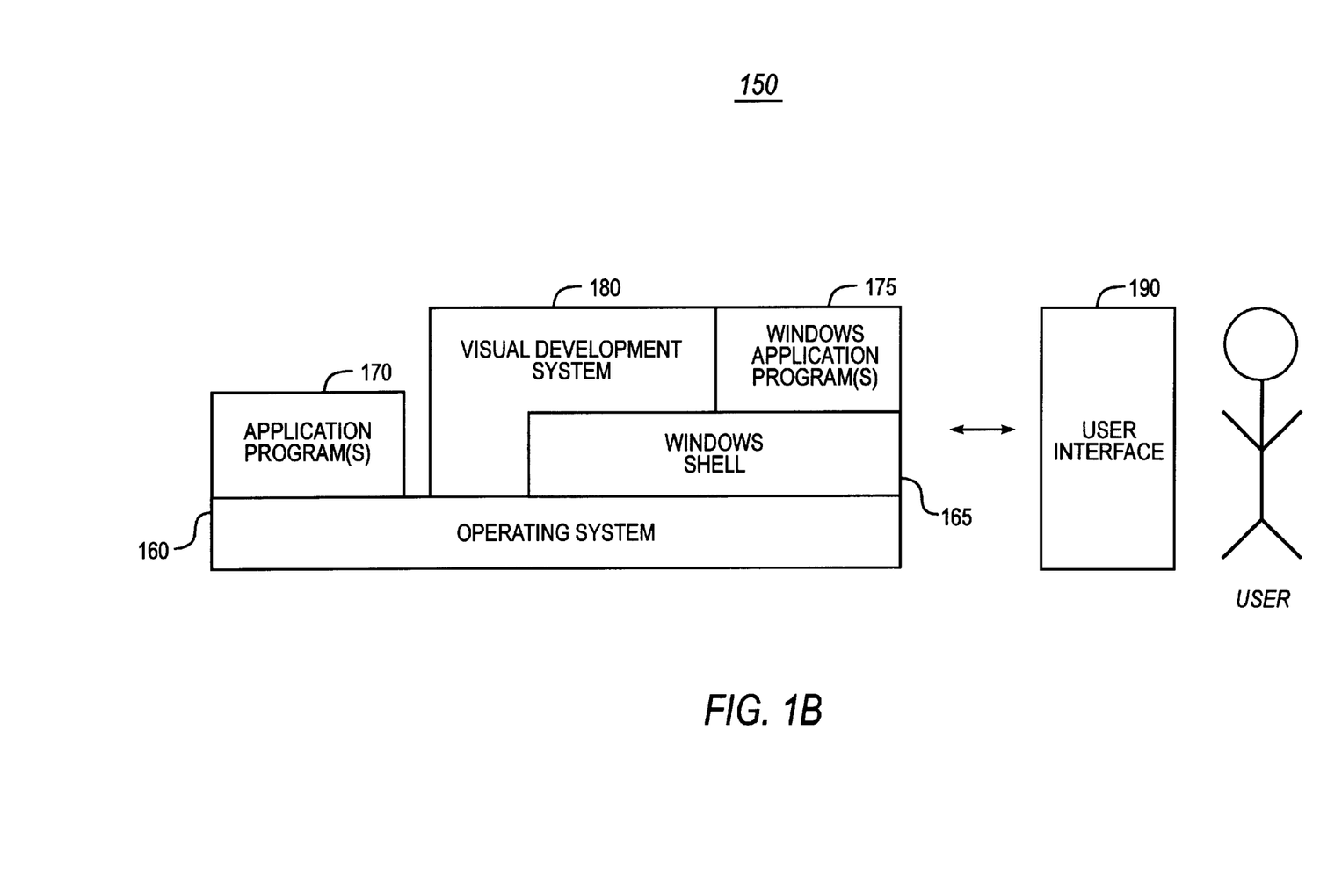
FIG. 1B is a block diagram of a software system for controlling the operation of the computer system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 175, may be "loaded" (i.e., transferred from storage 107 into memory 102) for execution by the system 100. OS 160 and shell 180, as well as application software 170, 175, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 and windows shell 180 are provided by Microsoft® Windows 95/Windows NT, available from Microsoft Corporation of Redmond, Wash. Those skilled in the art will appreciate that the system may be implemented in other platforms, including Macintosh, UNIX, and the like. Development system 200, on the other hand, includes a component-based visual development environment, of the present invention. Application software 170, 175 can be any one of a variety of software applications, such as word processing, database, spreadsheet, text editors, and the like, including those created by the development system 200.

C. Java language implementation

In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed into heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type (i.e., having data and behavior associated with instances of that class). The Java language does not support global functions or variables. Thus, each method (function) and variable exists within a class or an object (an instance of a class). In the Java language, the simplest form of a class definition is as follows.

```
class name {
    ...
}
```

The keyword class begins the class definition for a class named name. The variables and methods of the class are embraced by the curly brackets that begin and end the class definition block. A very simple "Point" class, for instance, may be declared as follows.

```
class Point {
    public double x;    /* instance variable */
    public double y;    /* instance variable */
}
```

This declaration serves as a template from which "Point" objects can be instantiated.

Actual instantiation of an object occurs in a manner similar to that found in the C++ programming language. The data associated with a class or object is stored in variables; the behavior associated with a class or object is implemented with methods. Methods are similar to the functions or procedures in procedural languages such as C. For example, a variable which refers to a "Point" object can be declared as follows.

```
Point myPoint;
```

An instance of a point object is allocated as follows.

```
myPoint=new Point( );
```

Here, one can now access variables of the "Point" object, using familiar "dot" notation for referring to the names of the variables.

```
myPoint.x=10;

myPoint.y=20;
```

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

The entry point of every Java application is its main method. When the user runs an application with the Java interpreter, he or she specifies the name of the class which is desired to be run. In response, the Java interpreter invokes the main method defined within that class. The main method controls the flow of the program, including allocating whatever resources are needed and invoking any other methods that provide the functionality for the application.

Every Java application must contain a main method with the following prototype or signature (i.e., modifiers, name, and parameters).

public static void main(String[ ] args)

The method signature for the main method contains three modifiers: public, static, and void. The public modifier indicates that the main method can be called by any object. The static modifier indicates that the main method is a class method. The void modifier indicates that the main method returns no value. The main method in the Java language is similar to the main function in C and C++. When the Java interpreter executes an application (by being invoked upon the application's controlling class), it starts by calling the class's main method. The main method then calls all the other methods required to run your application.

The Java Language is well documented in the technical, trade, and patent literature; see e.g., Gosling, J. et al., *The Java Language Environment: A White Paper*, Sun Microsystems Computer Company, October 1995. For a description of runtime execution of Java modules (including dynamic linking), see e.g., James Gosling, Bill Joy, and Guy Steel, *The Java Language Specification, Chapter* 12: *Execution* (particularly 12.2 Loading of Classes and Interfaces, and Linking of Classes and Interfaces), Addison Wesley, 1996. The disclosures of each of the foregoing are hereby incorporated by reference.

D. Development System

Figure 2A:
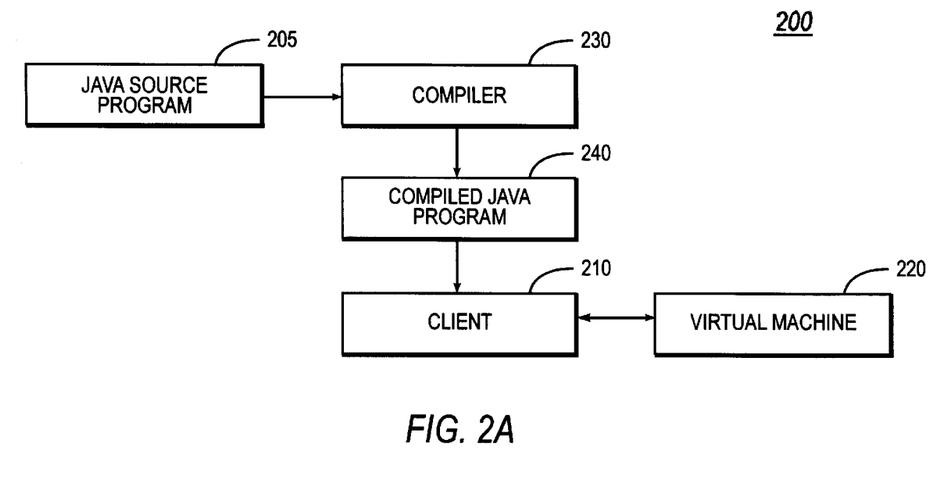
FIG. 2A is a block diagram of a Java development system.

Shown in further detail in FIG. 2A, a Java development system 200 of the present invention includes a client 210 which employs a virtual machine 220 for executing programs. In particular, the client 210 executes a "compiled" (i.e., bytecode or pseudo-compiled) Java program 240, which has been created by compiling a Java source code program or script 205 with a Java compiler 230. Here, the Java source code program 205 is an application program written in the Java programming language; the pseudo-compiled program 240, on the other hand, comprises the bytecode emitted by the compiler 230. The virtual machine 220 includes a runtime interpreter for interpreting the Java bytecode program 240. During operation, the client 210 simply requests the virtual machine 220 to execute a particular Java compiled program.

Figure 2B:
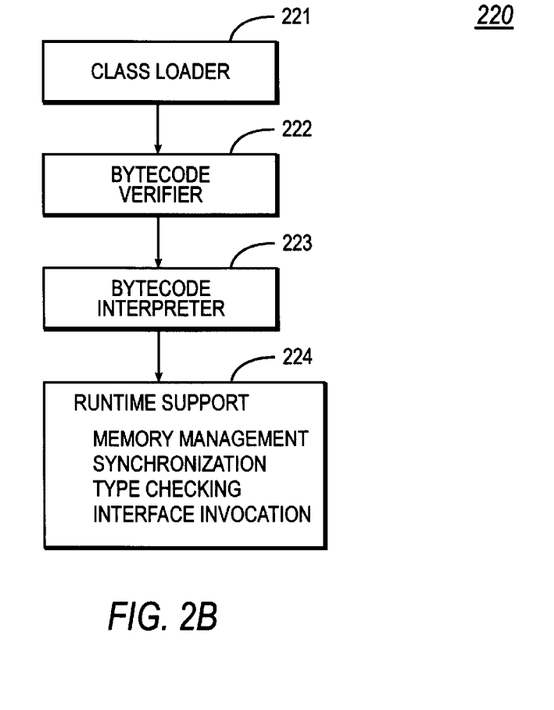
FIG. 2B is a block diagram showing further detail of the virtual machine of the Java development system of FIG. 2A.

As shown in FIG. 2B, the virtual machine 220 comprises a class loader 221, a bytecode verifier 222, a bytecode interpreter 223, and runtime support libraries 224. The class loader 221 is responsible for unpacking the class file which has been requested by a client. Specifically, the loader will unpack different sections of a file and instantiate in-memory corresponding data structures. The class loader will invoke itself recursively for loading any superclasses of the current class which is being unpacked.

The bytecode verifier 222 verifies the bytecode as follows. First, it checks whether the class has the correct access level. Since the class will access other classes for invoking their methods, the bytecode verifier must confirms that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These comprise the variables which are present only once (i.e., only one instance), for all objects of the class.

Runtime support libraries 224 comprise functions (typically, written in C) which provide runtime support to the virtual machine, including memory management, synchronization, type checking, and interface invocation. At the client, runtime support libraries 224 are included as part of the virtual machine; the libraries are not downloaded with the Java application. The bytecode which is executed repeatedly calls into the runtime support libraries 224, for invoking various Java runtime functions.

D. General development interface

The present invention is embodied in a component-based, rapid application development (RAD) Java environment. Many of the traditional requirements of programming, particularly for GUI applications, are handled for the programmer automatically by the system.

Figure 3:
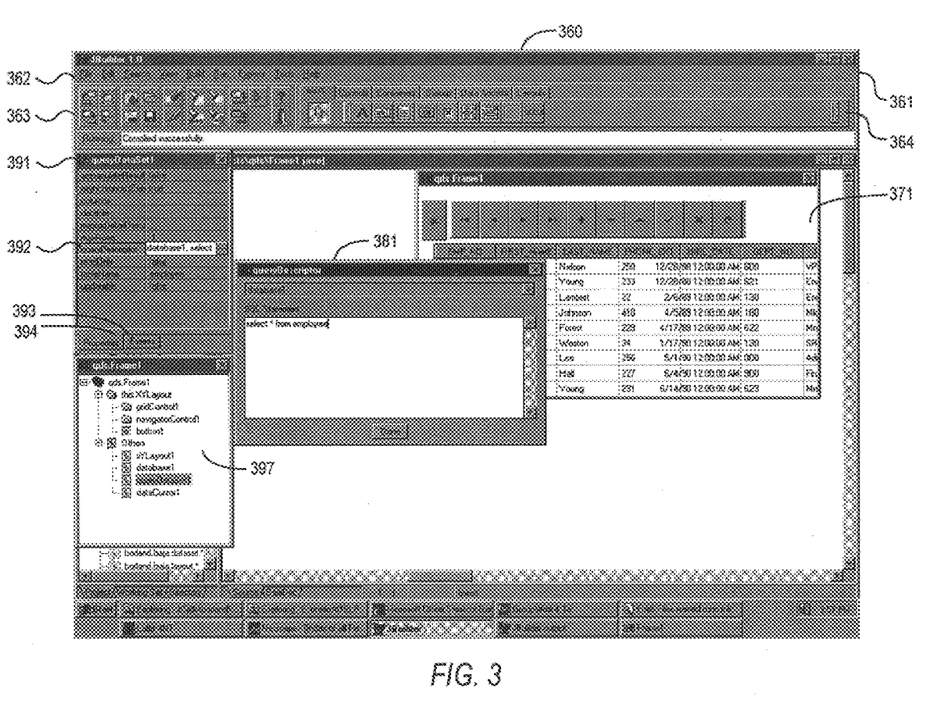
FIG. 3 illustrates a preferred interface of a Java-based visual development or programming environment provided by the system.

FIG. 3 illustrates a preferred interface of a Java-based visual development or programming environment 360 provided by the system. As shown, the programming environment 360 comprises a main window 361, a form 371, a editor windows (e.g., query descriptor editor window 381), and an object manager or "inspector" window 391 (with object explorer 397). The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands. Each editor, such as editor 381, is a full-featured editor that provides access to text in a given application project, such as Java code or SQL statements.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Thus, properties define a component's appearance and behavior.

Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install third-party components.

The object inspector window 391 enables the user to easily customize the way a component appears and behaves in the application under development. The inspector 391 comprises a properties page 394 having object property fields (e.g., field 392); an events page 393 displays, in a similar manner, object method fields. The object property field 392 shows the type and value of the currently-selected property. The properties page 394, therefore, serves to list the attributes of a component placed on a form (or the form itself) which can be customized. The events page, on the other hand, lists "event handlers" for a particular component. Event handlers are specialized procedures which may include user-provided program code.

The following description will focus on those features of the development system 200 which are helpful for understanding methodology of the present invention providing improved system performance by reducing recompilation of source modules during development of a program.

Methodology for Improving Recompilation in a Java-Based Environment

A. Overview

Certain modifications should not trigger a recompilation of the client modules. In accordance with the present invention, the following modifications do not trigger a recompilation of the client modules: (1) comment editing, (2) implementation change with no signature change, and (3) adding new fields or new (non-overloaded) methods to a class. When a Java class is extended (i.e., in a child class) or its implementation changes, on the other hand, the system recompiles the affected class. Note, however, that this does not require recompilation of those classes which are just importing the class.

Consider a change to a source module consisting of only changing the implementation of a particular method—that is, a change which does not affect the methods interface or signature. In such a case, there is no reason to recompile the clients of that method since the change does not affect them. As another example, consider a modification which adds new methods to a class, such as a Java class. The clients which do not see these new methods or fields have no reason to be recompiled, unless such clients derive new classes from the affected class (to avoid name collision).

In the currently-preferred embodiment, the system does not attempt to perform incremental recompilation of a given source module. With present-day hardware, together with the structure of Java code itself, recompilation of a given source module is fast, generally on the order of less than one second. Accordingly, the design complexity and runtime overhead which would be incurred for incrementally compiling within a given module does not justify the effort. Instead, the focus is on minimizing the various modules which need to be recompiled, as a typical program generally comprises a multitude of such modules. Any given source file generally does not exist in isolation, however. Java applications of even modest complexity require dozens or even hundreds of different source modules, all which must exist within a hierarchy (dependency) framework.

B. Method operation

During general operation, the system keeps track of several pieces of information. From the outset, the system has kept track of the timestamps of sources (e.g., A.java file in a Java system) and compiled files thereof (e.g., A.class class file in a Java system). Examination of the timestamps leads to detection of those files which have been modified. The system will recompile A.java in the following circumstances: (1) A.class is not found, (2) A.java has a different timestamp, or (3) A.class has a different timestamp. Otherwise, the system does not invoke a recompile. If a recompilation in not required, the system then looks to the imports for determining whether the imports are consistent. Here, the system checks the timestamps of imports, possibly recompiling one or more of the modules providing the imports. If the imports have been recompiled, then the system must check the root module for determining whether it remains consistent with the imports—that is, whether A is still consistent with its imports. If not, the system recompiles A.java.

Figure 4A:
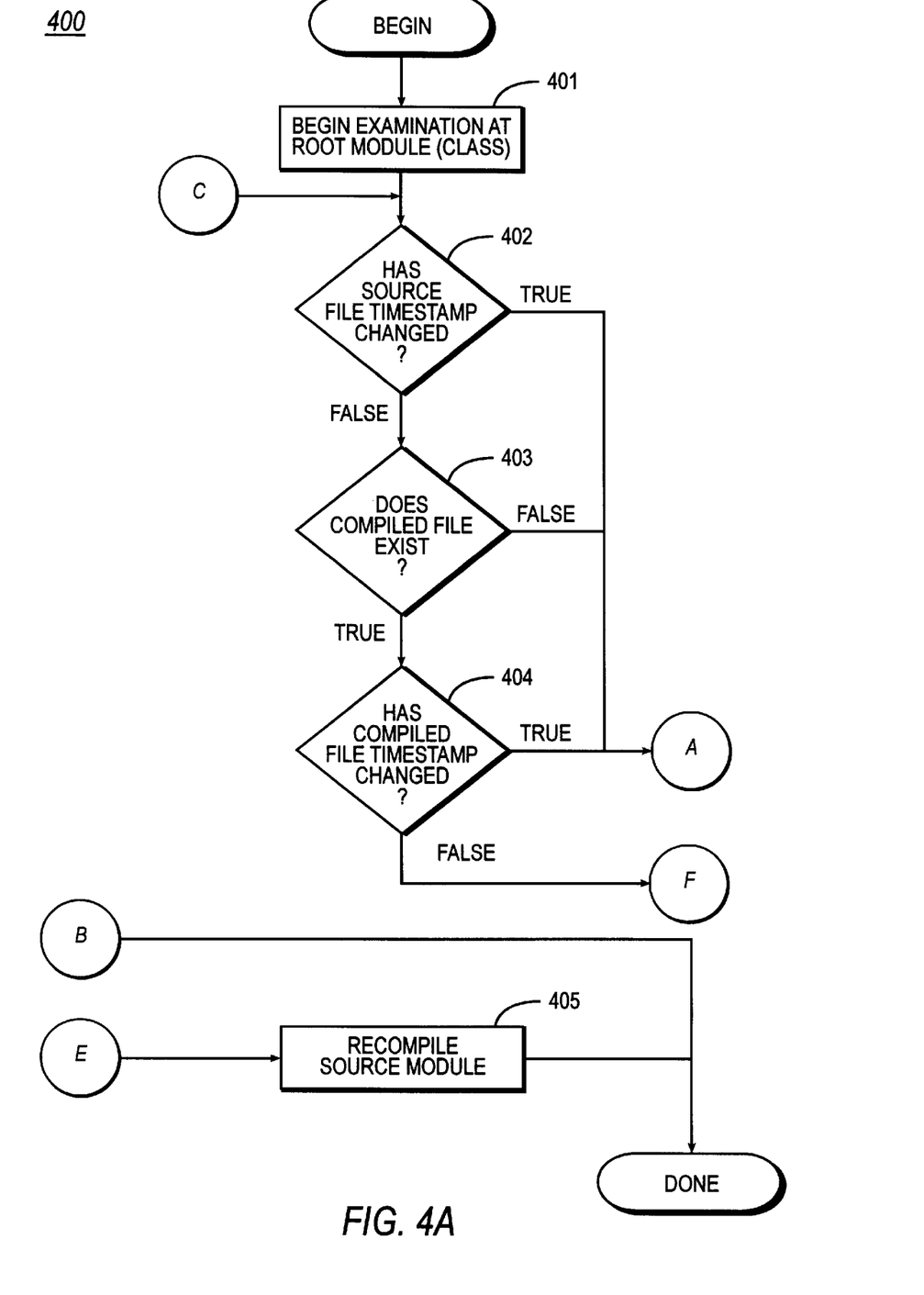
FIGS. 4A–C present a detailed flowchart illustrating a dependency checking method constructed in accordance with the present invention.
Figure 4B:
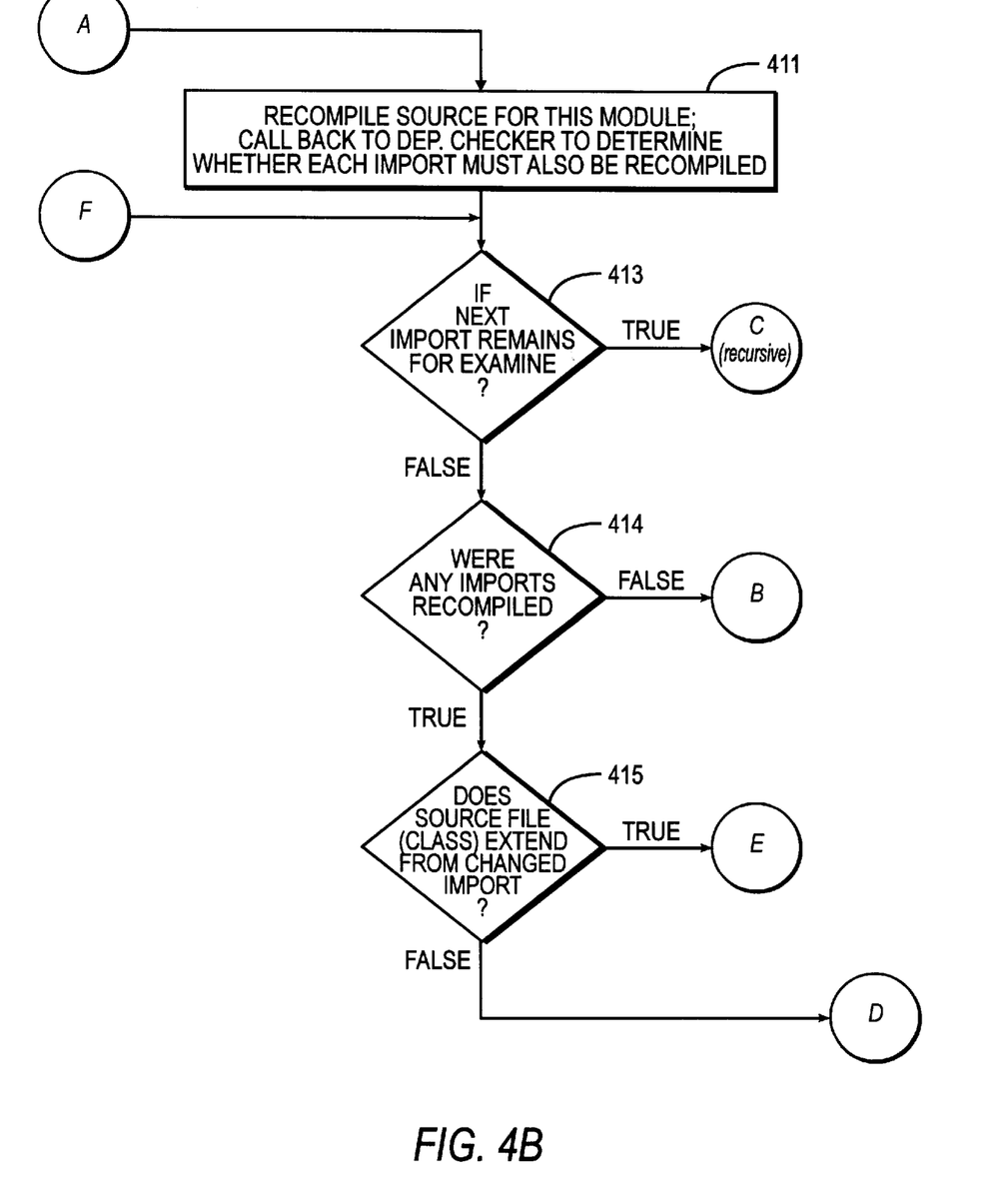
Figure 4C:
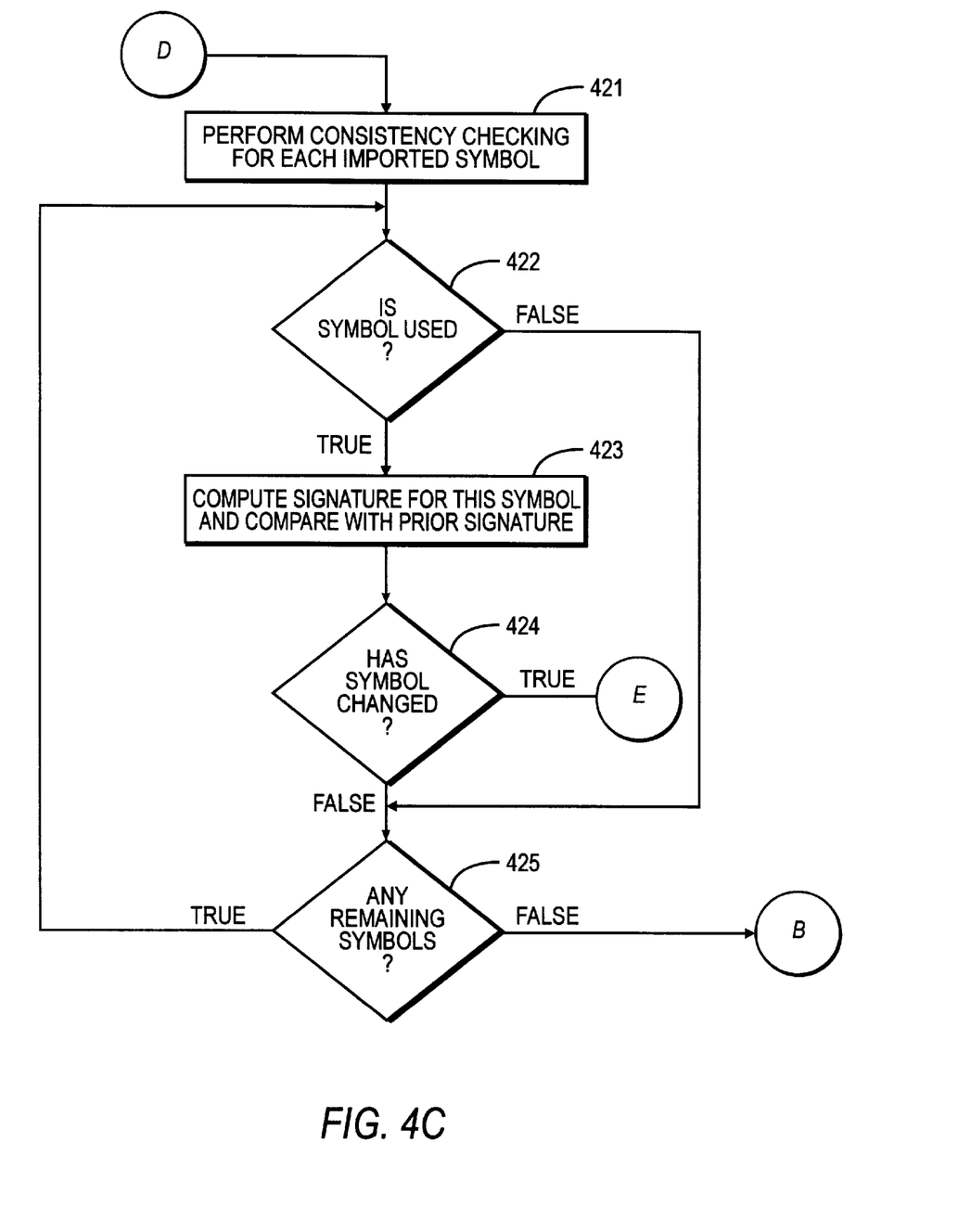

FIGS. 4A–C presents a detailed flowchart illustrating a dependency checking method 400 constructed in accordance with the present invention. The method begins with examination of the root (main) source file, as shown at step 401. At steps 402–404, the method will apply a series of tests against the module (and dependent modules during subsequent iterations of this recursive method) for determining whether recompilation is necessary. Specifically, at step 402, the source file's timestamp is examined to determine whether it has changed in a conventional manner, for determining files which have changed (i.e., have been edited by a user) since the last compilation. If the source itself has changed, the system recompiles the class, as indicated by the jump to step 411. If the time/date has not changed, on the other hand, the method examines the compiled file (e.g., Java class file) corresponding to the source, at step 403. If no such file is found, then the system will proceed to compile the source for generating an initial class file, as shown from the jump from step 403 ("false" case) to step 411. If the class file is already present but its state has changed apart from recompilation of the source (e.g., someone has copied a class file to the location), tested as step 404, the system recompiles, for ensuring consistency between the changed class file and the underlying source. During the recompilation at step 411, the compiler calls back into the dependency checker to determine whether each import must also be recompiled or, instead, the existing class file is used to compile the importing module.

If nothing has changed, the system can proceed directly to step 413, without compiling the current module, for examining all the imports for the class. Specifically, the method will recursively apply the just-described technique for the imports. A loop is established at step 413 to loop through all imports, thereby recursively invoking the method, beginning at step 402. After conclusion of this phase, one or more imports might have required recompilation (tested at step 414). In such a case, the system still must check that the root class remains consistent with the imports (tested at step 415), once the imports have been recompiled. Specifically at this point, if the root class extends from those imports and the imports have really changed (i.e., a change in the sum of all exported signatures), the system must then recompile, as indicated by the jump from step 415 to step 405. Otherwise, the system continues on to step 421 for applying fine-grain consistency checking.

With fine-grain dependency checking, the system examines dependencies at the object level. Consider, for instance, the following example.

| A.java | C.java |
|--------|--------|
| . . . C.x | public static int x;<br>new → public static int y; |

Inserting y in module C should not trigger a recompilation of A. Changing type or accessibility of x should trigger a recompilation of A, however. A.class does not contain any information about the accessibility of C.x, just the name and type of C.x. If the static modifier in the declaration of x is removed, the system must detect whether A is inconsistent. It must be recompiled (and an error will be emitted).

For each class, the system keeps a list of exported names—symbols available for use by other modules—together with a fingerprint or signature. The signature is a hash code representing the type (or signature) and accessibility of each name. For a method, the signature does not reflect the implementation of the method but, instead, the prototype signature (i.e., method name plus modifiers and parameter information) for the method. If the signature remains unchanged, modules which are dependent on that method need not be recompiled. Also, the system keeps a list of imported classes (with timestamps) and for each class, a list of imported names with fingerprints, representing the type and accessibility of the name at the time of the last compilation of A. In the currently-preferred embodiment, these lists of imported and exported names (with fingerprints and timestamps) for all the classes in the same package are stored together in one file per package. These dependency files are generated during the first build of the class and are updated as recompilations occur. The methodology of the present invention is applied to the root class and applied recursively to all imports of the root (without use of "make" files).

In an exemplary embodiment, the signature is computed as a cyclic redundancy checksum (CRC) value. As with any computed checksum, the possibility of collision exits—that is, that two separate methods yield the same checksum value. In such a case, however, the collision (which is a rare event) can be dealt with at runtime, when the incompatibility will be detected by the runtime system. Upon encountering such an error, the system can at that time simply recompile.

The system proceeds as follows. If a symbol in an imported class is available for use (i.e., exported from its own class) in the current module under examination (tested at step 422), the system computes a signature which specifies the symbol's object (or method) type (i.e., class from which it was created), including the accessibility of that object's fields, as shown at step 423. Otherwise (i.e., "false" at step 422), the method proceeds to step 425, for testing whether to loop on any remaining symbols.

In Java, there are two basic types of symbols: fields and methods. Fields represent variables such as instance variables and static variables. Methods, on the other hand, represent the programmer-assigned name for each class method. At the point of performing consistency checking for each symbol, the system must discern that the symbol is in fact being used and, if used, whether it has changed. The class file, since it only defines the name of the symbol, does not provide this information itself (i.e., it only includes the name which is to be linked). For a method symbol, for instance, the computed signature includes information about the method's name and parameter information, together with a list of exceptions which can be thrown by the method. Based on this information, the system can compute a signature or fingerprint which fully characterizes each object or method. In this manner, when a file has changed, the system can examine signatures for determining whether individual object or methods have changed (i.e., an object's or method's fingerprint has changed since last compile).

When a change is detected, tested at step 424, the method at that point can invoke the compiler for recompiling the current module (which is dependent on the changed symbol). The fine-grain consistency examination is continued for any remaining symbols, tested at step 425. If no imported symbols have changed and all symbols which are used from the imported classes have been examined, the method will conclude, as shown by the jump for the "false" case of step 425. With fine-grain dependency checking, therefore, the system has discerned not only that two class are dependent but, also, exactly which symbols used between the classes have changed.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a development system for creating a software program by a process which includes compiling a hierarchy of interdependent source code modules, wherein some of the source code modules are dependent on imports comprising symbol information imported from others of the source code modules, a method for recompiling only those particular source code modules which require recompilation when a modification occurs to any one of said source code modules, the method comprising:

(a) beginning with a source code module which serves as a root source code module of said hierarchy of interdependent source code modules, determining whether a particular source code module under examination has itself been modified;

(b) if the particular source code module has itself been modified, recompiling the particular source code module, including invoking the method for each source code module which provides imports to the particular source code module, for determining which source code modules providing imports require recompilation, and thereafter terminating execution of the method; and (c) if the particular source code module has not itself been modified, examining each import of the particular source code module by performing substeps of:

(i) if none of the imports have themselves been modified since last compiling the particular source code module, terminating execution of the method, (ii) if some of the imports have themselves been modified since last compiling the particular source code module, invoking the method for each source code module which provides imports to the particular source code module, for determining which source code modules providing imports require recompilation, (iii) if any of the imports have been recompiled and if the particular source code module extends from imports which have changed symbol information and which have been recompiled, recompiling the particular source code module and thereafter terminating execution of the method, and (iv) if any of the imports have been recompiled and if the particular source code module does not extend from imports which have changed symbol information and which have been recompiled, performing substeps of:

determining whether any of the imports include a symbol which has changed and which is used by the particular source code module, and recompiling the particular source code module if any import includes a symbol which has changed and which is used by the particular source code module, and thereafter terminating execution of the method.

2. The method of claim 1, wherein said source code modules include Java-compatible source code module.

3. The method of claim 2, wherein said root source code module comprises a Java-compatible source code module having a main method.

4. The method of claim 1, wherein said symbol information comprises symbol information for variables defined in the software program.

5. The method of claim 4, wherein said symbol information for variables comprises name and type information for variables.

6. The method of claim 1, wherein said symbol information comprises symbol information for methods defined in the software program.

7. The method of claim 6, wherein said symbol information for methods comprises name and parameter information for methods.

8. The method of claim 7, wherein said symbol information for methods further comprises exception handling information for methods.

9. The method of claim 1, wherein imports include symbol information for variables and methods imported into a first source module from a second source code module, so that said first source module can employ variables and methods imported from the second source code module.

10. The method of claim 1, wherein said recompiling steps includes compiling source code statements into a compiled object module.

11. The method of claim 10, wherein said source code statements comprise Java-compatible source code statements and wherein said compiled object module Java-compatible compiled class files.

12. The method of claim 11, wherein each of the compiled object module Java-compatible compiled class files.

13. The method of claim 1, wherein each recompiled source code module generates a compiled opcode module.

14. The method of claim 13, wherein said software program dynamically loads compiled opcode modules, as each is required at runtime.

15. The method of claim 1, wherein step (a) includes:

determining whether a particular source code module under examination has a changed timestamp, when compared to when the particular source code module was last compiled.

16. The method of claim 1, wherein step (a) includes:

determining whether a particular source code module under examination has never been compiled.

17. The method of claim 1, wherein said determination of whether any of the imports include a symbol which has changed includes:

computing a fingerprint for each symbol of a given import and comparing the computed fingerprint to a prior fingerprint for when the symbol was last compiled.

18. The method of claim 17, wherein said computed fingerprint includes a checksum derived from the given symbol.

\* \* \* \* \*